United States Patent [19]

Sakurai et al.

[11] 4,229,642
[45] Oct. 21, 1980

[54] AUTOMATIC WELDING APPARATUS FOR LONG WORKPIECES

[75] Inventors: Hajime Sakurai, Kobe; Yoshinori Higuchi, Osaka, both of Japan

[73] Assignee: Shin Meiwa Industry Co., Ltd., Nishinomiya, Japan

[21] Appl. No.: 938,541

[22] Filed: Aug. 31, 1978

[30] Foreign Application Priority Data

Aug. 31, 1977 [JP] Japan .................. 52-105356

[51] Int. Cl.² ............................... B23K 37/04
[52] U.S. Cl. .................. 219/125.1; 219/124.1; 219/60 A; 228/45
[58] Field of Search ........... 219/125.1, 125.11, 124.1, 219/124.32, 124.31, 124.4, 60 A; 266/57, 61; 228:/29, 32, 45; 269/56, 57, 59; 214/1 CM

[56] References Cited

U.S. PATENT DOCUMENTS

| 1,910,259 | 5/1933 | Raymond | 219/125.1 |
| 3,072,779 | 1/1963 | Masters et al. | 219/124.31 |
| 3,104,313 | 9/1963 | Rieppel et al. | 219/125.1 |
| 3,272,347 | 9/1966 | Lemelson | 214/1 CM |
| 3,450,858 | 6/1969 | Pandjiris | 219/125.1 |
| 3,665,148 | 5/1972 | Yasenchak et al. | 219/124.4 |
| 3,918,628 | 11/1975 | Clavey | 219/60 A |
| 4,014,495 | 3/1977 | Oda et al. | 219/125.1 |

Primary Examiner—R. N. Envall, Jr.
Assistant Examiner—Clifford C. Shaw
Attorney, Agent, or Firm—Griffin, Branigan & Butler

[57] ABSTRACT

An automatic welding apparatus including a movable welding torch carried by a composite frame adapted to control the relative position of the torch with respect to a workpiece holder. Either the workpiece holder or composite frame may be supported on a movable base comprising a truck mounted on a track for movement in a longitudinal direction. The truck is capable of being fixedly positioned at a number of predetermined work stations along the track.

5 Claims, 8 Drawing Figures

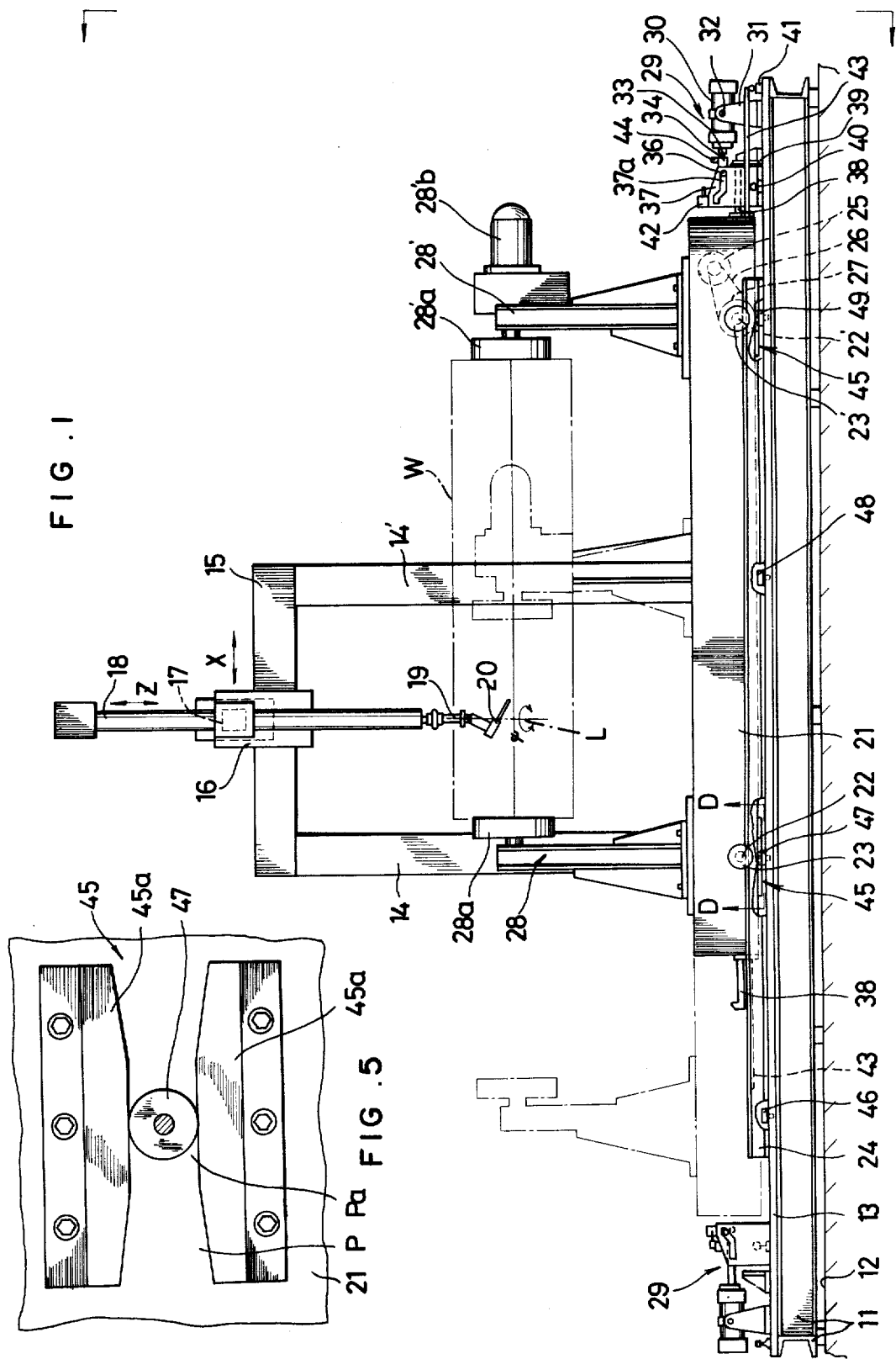

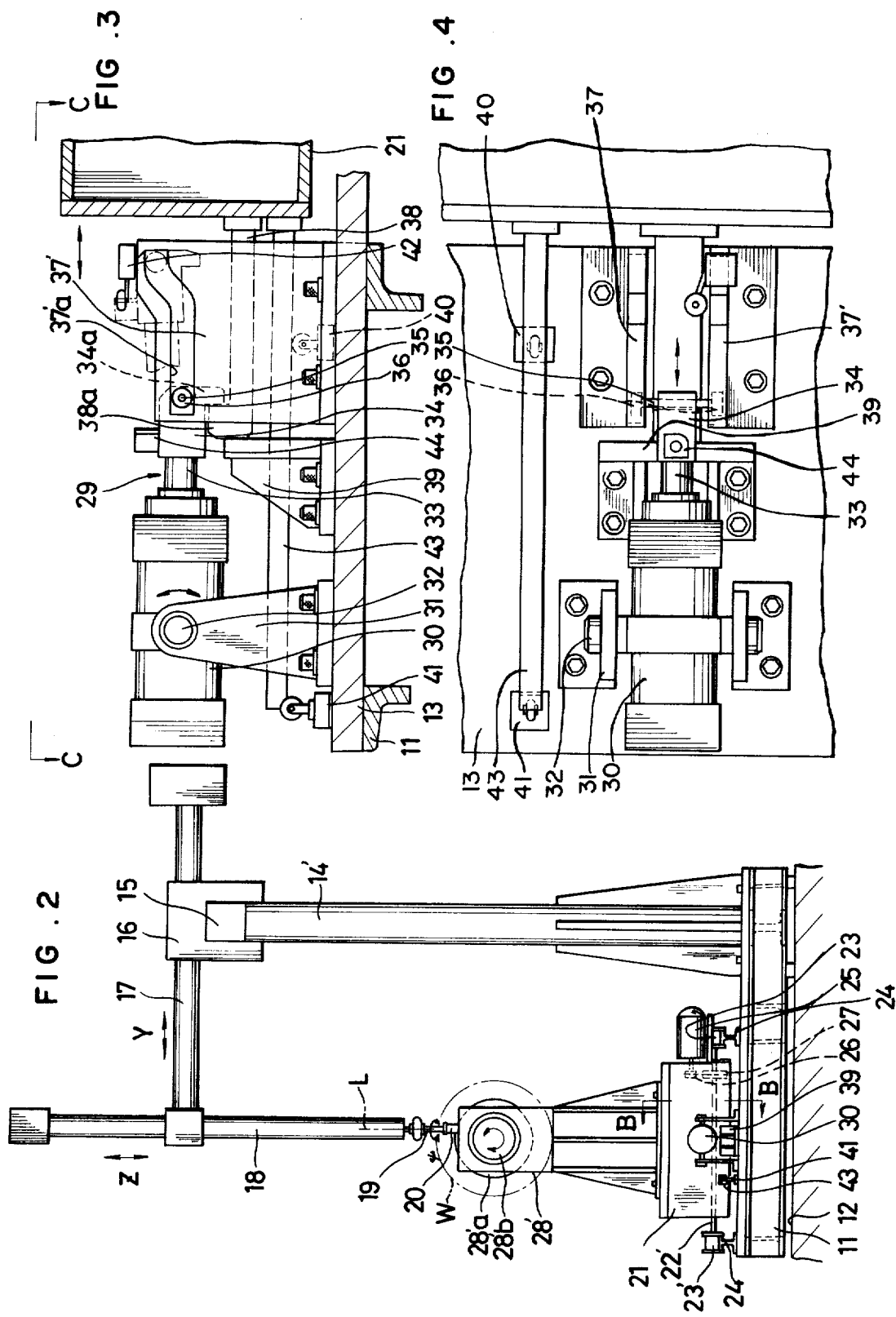

AUTOMATIC WELDING APPARATUS FOR LONG WORKPIECES

BACKGROUND OF THE INVENTION

This invention relates broadly to an automatic welding apparatus for performing welding operations on comparatively large and long workpieces and more particularly to an arrangement wherein a movable base is utilized to support either a composite, welding torch carrying frame or workpiece holder such that the frame and holder are relatively movable with respect to one another along a longitudinal axis.

In order to accomplish the automatic welding of a workpiece in three dimensions, the conventional apparatus provides the welding torch or tool with the capability of being movably located within a three dimensional space which defines the operational limits of the apparatus. Customarily the workpiece to be welded is mounted within the reach of the tool by a stationary workpiece holder which is affixed to a floor plate. Problems arise with this arrangement when a workpiece needs to be welded which has dimensions that exceed the reach of the tool. In order to bring all points of the workpiece within reach of the tool, a plurality of set-ups would be required. Each set-up involves an operator removing the workpiece from its holder so that previously unobtainable points on the workpiece are brought into the reach of the tool. Accordingly, the set-up operation requires that all welding be suspended while the workpiece is being remounted. This reduces work efficiency; and decreases the accuracy of the welding operation since a plurality of location points are necessary to orient the workpiece with respect to the apparatus' spacial positioning reference frame. If a heavy workpiece is being welded, the risk of an industrial accident is increased when the use of a crane or other transport device is necessitated.

In order to eliminate the need for a number of set-ups, it is known in the prior art to provide an automatic welding apparatus with a workpiece holder structure which provides the necessary degree of freedom of movement to present a workpiece to a fixed welding tool. This approach involves the use of a workpiece holder structure that is extremely complex, and adds to the overall cost of manufacture as well as demanding increased maintenance considerations.

Another prior art approach is disclosed in Oda et al. U.S. Pat. No. (4,014,495) which relates to an automatic welding apparatus that combines a movable workpiece holder with a welding tool capable of being positioned at any point within a three dimensional space. The tool is attached to a composite frame adapted to provide movement in three mutually orthogonal directions such as in the longitudinal, lateral, and vertical direction, and may be rotated around a vertical axis. The workpiece holder is adapted to be rotated around a horizontal axis. The position of the workpiece holder is controlled by a servo system under the command of a programmable computer device. Although larger workpieces can be handled by such an arrangement, the primary object of the Oda invention is to provide an automatic welding apparatus wherein the necessary degree of freedom of movement is divided between a workpiece holder and a welding tool. This prior art approach also has similar faults aforesaid when a workpiece needs to be welded which has dimensions that exceed the reach of the tool.

SUMMARY OF THE INVENTION

Therefore, it is an object of this invention to provide an automatic welding apparatus adapted to perform the welding operation of relatively large, long workpieces without interruption.

A further object of the invention is to provide an automatic welding apparatus which is inexpensive to manufacture and easy to maintain.

Yet another object of the invention is to provide an automatic welding apparatus having a movable workpiece holder which is simple and adapted to bring all points of a relatively long, large workpiece into the reach of a movable, positionable welding tool.

In accordance with the principles of the present invention, an automatic welding apparatus comprises a welding torch which is carried by a composite frame adapted to control the spatial position of the tool within a three dimensional work space. The composite frame allows for movement in the longitudinal, lateral and vertical directions as well as being rotatable around a vertical axis. Also included is a workpiece holder adapted to fixedly orient a piece to be welded within the reach of the tool. In order to increase the reach of the tool, a movable base is included which is adapted to support either the composite frame or the workpiece holder so that the frame and holder are movable with respect to one another along a longitudinal axis. The movable base includes one truck which is guided along rails to predetermined work stations. A positioning means is provided with ensures accurate positioning at each work station and locking means are also included to prevent any movement of the truck once it has been positioned at the work station.

BRIEF DESCRIPTION OF THE DRAWINGS

The foregoing and other objects, features and advantages of the invention will be apparent from the following more particular description of the preferred embodiments of the invention, as illustrated in the accompanying drawings in which like reference characters refer to the same parts throughout different views. The drawings are not necessarily to scale, emphasis instead being placed upon illustrating the principles of the invention.

FIG. 1 is a front view showing one embodiment of the present invention;

FIG. 2 is a side view of the present invention taken from the A—A arrow direction as seen in FIG. 1;

FIG. 3 is an enlarged view of a locking means taken from the B—B arrow direction as seen in FIG. 2;

FIG. 4 is a top view of the locking mechanism of FIG. 3 taken from the C—C arrow direction as seen in FIG. 3;

FIG. 5 illustrates one embodiment of a positioning means as viewed from the D—D arrow direction as seen in FIG. 1;

DETAILED DESCRIPTION OF THE PREFERRED EMBODIMENTS

Figure 6:
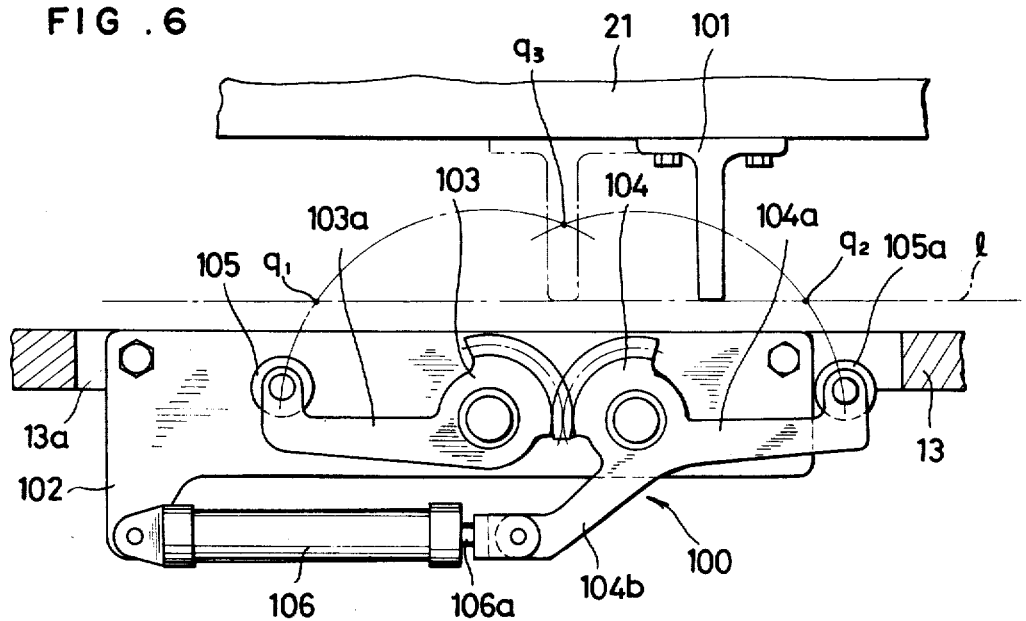
FIG. 6 is an enlarged view showing another positioning arrangement for the present invention.

Referring to FIG. 1, an automatic welding apparatus is illustrated which is supported by a rectangular foundation 11 adapted to be placed on a floor surface 12 so that a base plate 13 may be affixed over the entire top surface of the rectangular foundation. This arrangement provides support for the welding apparatus which is appropriately positioned upon the foundation.

A composite frame is utilized to locate a welding torch 20 at any point within a three dimensional work space. The composite frame includes two vertically disposed columns 14, 14' which are spaced apart from one another at the middle, back portion of the base plate 13. A cross beam 15 is secured to both columns 14, 14' so that it extends horizontally between them. A traveler 16 is mounted on the cross beam 15 and is adapted to slide right-and-left cross beam 15 in the X direction. A horizontal arm 17 is mounted on the upper portion of traveler 16 so as to be slidable back-and-forth in the Y direction as seen in FIG. 2. A vertically sliding tubular member 18 is mounted on the work piece holder end of the horizontal arm 17 so as to be movable in the vertical or Z direction as seen in FIGS. 1 and 2.

A welding torch fixture 19 is supported at the lower end of the vertical member 18 and is adapted to be rotated around a vertical axis L. The welding torch 20 is attached to the welding torch fixture 19, and this arrangement allows for movement in three mutually orthogonal directions such as in the longitudinal (X-direction), lateral (Y-direction), and vertical (Z-direction) directions, as well as providing rotation around the vertical axis. The position of the welding torch 20 is controlled by a computer apparatus (not shown) which drives motors to in turn move traveler 16, horizontal arm 17 and vertical member 18, and rotationally drive welding torch fixture 19.

In order to increase the reach of the welding torch 20, a pair of workpiece fixtures 28, 28' which are adapted to support a workpiece W, are installed on a movable truck 21 having flanged wheels 23, 23, 23', 23' mounted on rotatable shafts 22, 22'. The wheels are adapted to roll on I-beam rails 24, 24' (FIG. 2) which are spaced parallel to one another and fixed to the base plate 13.

A reversible motor 25 is installed on the right-hand side of truck 21 to provide the requisite power source to move the truck 21 along rails 24, 24'. The reversible motor 25 is connected to the truck 21 by an endless chain 26 that engages a sprocket 27 fixed to the rotatable shaft 22'. The truck is capable of being positioned at either a right-hand work station as illustrated in FIG. 1 by the solid lines, or at a left-hand work station illustrated in phantom outline in FIG. 1.

The workpiece fixture 28, 28' which is mounted on the truck 21 includes disc fixture plates 28a, 28'a. The left side fixture plate 28a is mounted so as to be freely rotatable about its horizontal axis, and the right side fixture plate 28'a may be driven about its horizontal axis. A reversible motor 28'b is installed on the right-hand side of work fixture 28' and provides the necessary power to drive the fixture plate 28'a.

The distance between work fixtures 28, 28' is two times the distance separating columns 14, 14'. When the truck 21 is positioned at the right-hand work station, the left fixture 28 is disposed in front of the left side column 14 as shown with full lines in FIG. 1. Subsequently, when the truck is located at the left-hand work station, the right side fixture 28' is disposed in front of the right-side column 14' as shown with dotted lines in FIG. 1. This arrangement allows a relatively long, large workpiece to be welded without interruption even though the dimensions of the workpiece exceed the reach of the welding torch 20. In addition, this approach requires that the workpiece holder be positioned at either one of two work stations and thereby eliminates the need for a number of set-ups of the workpiece.

In order to ensure proper positioning at each of the work stations, positioning devices 29, 29 are installed at the right-hand and left-hand ends of the base plate 13 and are adapted to lock truck 21 in place at a work station. Since the two positioning devices 29, 29 are identical in construction, reference will be made only to the right-hand side device 29.

Referring to FIG. 3, the positioning device 29 utilizes an air cylinder 30 which is supported by a bracket 31 and a support pin 32 on the base plate 13. This arrangement provides a pivotal support point at the middle portion of the air cylinder 30 so that it may swing in a vertical plane around the pivot point. A rod 33 extends from the cylinder 30 and is attached to a latch 34. The latch 34 has a shaft pin 35 having rollers 36, 36 mounted at each end. The rollers 36, 36 are guided along slots 37a, 37'a which are provided in the upwardly extending arms of L-shaped brackets 37, 37'. The brackets are fixed to the base plate 13. The slots 37a and 37'a slope upwardly at the portions adjacent to truck 21, as best seen in FIG. 1. A latch arm 38 projects from each side of the truck 21 and has a latch member 38a which is adapted to abut a stopper 39 when the truck 21 is positioned at a work station.

In order to locate the truck 21 at a work station, the air cylinder 30 is charged with a compressed fluid so that rod 33 is extended. Accordingly, the rollers 36, 36 of the latch 34 are guided to the uppermost position of slots 37, 37'a so as to incline the air cylinder 30. This causes a hook 34a of the latch 34 to be pivoted upwardly allowing the latch arm 38 of truck 21 to pass freely beneath the hook 34a. This arrangement is illustrated by the dotted lines in FIG. 3.

In order to lock the truck 21 in place at a work station, the latch member 38a of the latch arm 38 is passed beneath the hook 34a of latch 34 so that the latch member 38a is stopped adjacent to but not in contact with the stopper 39. Subsequently, the air cylinder 30 is actuated to pull rod 33 towards the cylinder 30. As a result, hook 34a engages latch member 38a and the truck 21 is pulled towards the stopper 39 unitl latch member 38a engages stopper 39. In this manner, the truck is located at a work station having a position which is known with respect to the positioning coordinate system of the welding tool.

The positioning device 29 includes first, second, and third limit switches 40, 41, 42 respectively. The first and second limit switches 40, 41 are positioned apart from one another on the base plate 13 and are adapted to engage a long, rod-like striker 43 which projects from each side of the truck 21. The first limit switch 40 provides a signal for stopping motor 25, while the second limit switch 41 provides a signal which indicates a weld operation may begin because latch member 38a abuts stopper 39. The third limit switch 42 is affixed to the top of the L-shaped bracket 37' and is operated by a striker 44 attached to latch 34 when the latch 34 is moved into its upper-most position. Switch 42 provides for the generation of "go ahead" signals which approve the travelling operation of truck 21 when it is moved from one work station to another.

Turning to FIG. 5, members 45, 45 are utilized to accurately position the truck 21 in the Y direction at a location in proximity to the work station and lock the truck 21 in a direction lateral to the rails 24, 24'. This is accomplished by utilizing a pair of convex-like bending plates 45a, 45a which are attached to truck 21 and situated opposed to one another so as to form a guide path P therebetween. The guide path P has a constricted throat portion Pa which is situated between two wider portions. Rollers 46, 47, 48, 49 are freely rotatable about vertical axes and are spaced at equal distances on base plate 13. When the truck 21 moves towards the right-hand work station (as seen with full lines in FIG. 1), the rollers 47, 49 are forced into the throat path portions Pa, thus accurately positioning the truck in the Y direction. Conversely, when the truck 21 approaches the left-hand work station (as shown with dotted lines in FIG. 1), rollers 46, 48 are forced into the throat path portions Pa to obtain the Y-direction positioning.

In operation, a workpiece W is fixed through suitable jigs (not shown) to the fixture plates 28a, 28'a while the truck 21 is positioned at the predetermined right-hand work station. A microcomputer which is situated in a separate remote control device (not shown), oversees the welding operation. To start the work fixture 28, 28' is located at the right-hand work station. With the truck 21 positioned so that fixture 28 and 28' are at the right-hand station, the microcomputer responds to depressing of a start button and controls motor 28'b to rotate the work, the motor which rotates the welding torch fixture, the motor for moving the traveller 16 in the X direction, the motor for moving the arm 17 in the Y direction, and/or the motor for moving arm 18 in the Z direction. All of these movements are combined so as to move the welding torch 20 over any desired patch extending over the left half of the surface of work W. The microcomputer simultaneously controls the welding current. Once the welding operation is completed for the left half of workpiece W, the right-side air cylinder 30 is actuated to extend rod 33, thereby detaching hook 34a from the latching member 38a and causing latch 34 to pivot upwardly. At this time, the striker 44 is moved to engage and operate the third limit switch 42 so that motor 25 is actuated to drive the truck 21 in a left-hand direction along the guide rails.

When the truck 21 approaches the left-hand work station, the striker 43 first engages the first limit switch 40 which stops motor 25 and actuates a timer (not shown) which controls the air cylinder 30 connected to push rod 33. Even in the case, the truck 21 is still advanced by inertia but perfectly stopped by arrival of latch member 38a immediately before stopper 39. When the truck 21 perfectly stops, latch 34 descends along slots 37a, 37'a as the rod 33 is drawn into cylinder 30 so that hook 34 engages the latch member 38a. As the rod 33 is drawn further into cylinder 30, the truck 21 is pulled toward the left-hand positioning device 29 until the latch member 38a abuts stopper 39. At this time, the striker 44 engages the second limit switch 41 and thereby generates a signal which indicates a weld operation may begin. The truck 21 is thus securely and accurately positioned in the X direction.

As the truck 21 is pulled towards the left-hand positioning device 29, the back-and-forth (Y-direction) positioning device 45, 45 is situated so that rollers 46, 48 are forced into the throat Pa so as to ensure an accurate positioning of the truck in the Y direction.

Once the truck is positioned at the left-hand work station, the welding operation on the right-hand side of the workpiece W commences in response to said signal from the second limit switch 41. When this is finished, the truck 21 is released and again returned to the right-hand work station. The finished work may now be removed and a new workpiece mounted in work fixtures 28a, 28'a.

Figure 7:
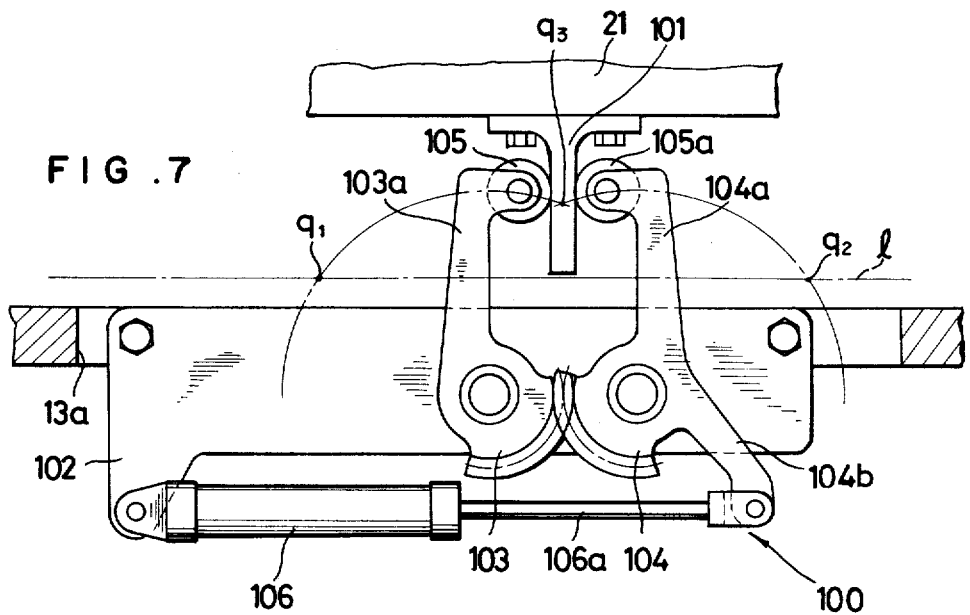
FIG. 7 illustrates the operation of the positioning arrangement illustrated in FIG. 6.
Figure 8:
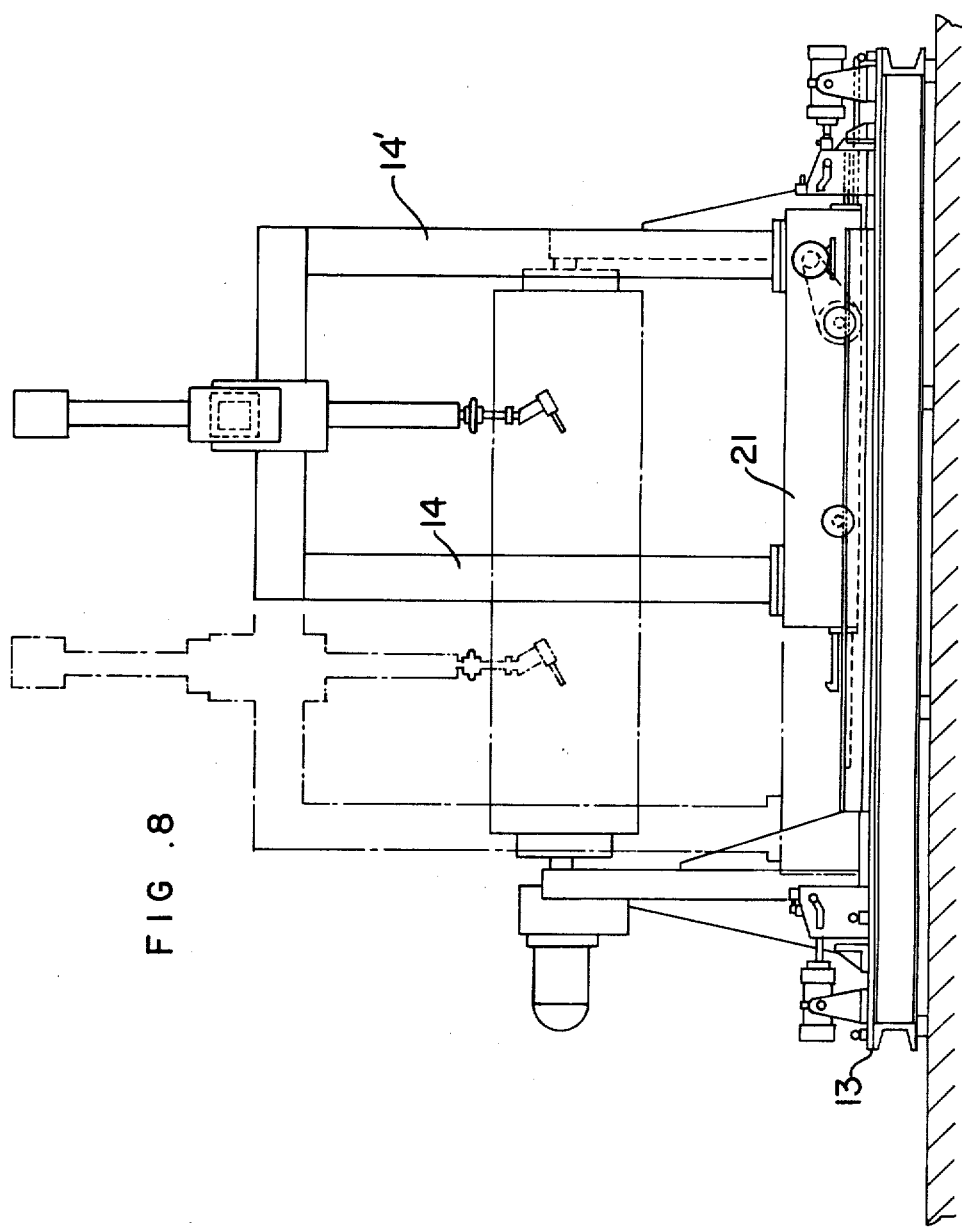
FIG. 8 is a rear elevation showing another embodiment of the present invention.

FIGS. 6 and 7 show another embodiment of the invention. A member seen generally at 100, is utilized to position and fix the truck 21 at a right-hand work station, a left-hand work station, and at a middle work station located between the right and left-hand work stations. The device 100 is disposed at an appropriate middle location on base plate 13 while a downwardly extending member 101 is provided on the lower surface of the truck 21. The positioning arrangement further includes a side plate 102, two segment gears 103, 104, two arms 103a, 104a, rollers 105, 105a, and an air cylinder 106. The side plate 102 is fixed to the side surface 13a of a hole portion formed in the base plate 13. The two gears 103 and 104 are supported by pivot pins secured to the side plate 102. The teeth of segment gears 103 and 104 mesh with one another. Opening and closing arms 103a and 104a extend from segment gears 103 and 104, respectively. When the segment gears 103 and 104 are rotated, the arms 103a and 104a are moved between an opened position as seen in FIG. 6 and a closed position as seen in FIG. 7. Rollers 105 and 105a are rotatably supported at the extremities of arms 103a and 104a respectively. The air cylinder 106 is attached to the side plate 102 by a pin so that the air cylinder may be pivoted around the pin. A piston rod 106a is pivotally connected to an arm 104b which extends from gear 104. As illustrated in FIG. 6, the arms 103a, 104a and the rollers 105, 105a are normally maintained below the path of travel of the downwardly extending member 101. This allows truck 21 to pass without any interference. When it is desired to stop the truck at the middle position, a striker (not shown) on the lower surface of the truck 21 operates a limit switch (not shown) located on the base plate 13 to brake motor 25. The truck may advance somewhat after the power to motor has been terminated, but will stop so that member 101 is located between points Q1 and Q2 once the truck has come to a complete stop. Thus, when braking is released and a timer (not shown) actuates air cylinder 106 to extend rod 106a, arms 103a and 104a are pivoted towards one another to achieve a closed state as illustrated in FIG. 7 with the center of member 101 located at point Q3 and member 101 clamped in place by rollers 105, 105a. This accurately positions truck 21 in the X direction.

This construction allows truck 21 to be positioned and fixed in a middle position between the right-hand and left-hand work stations a situation which might arise when it is desired to weld only the middle portion of a long workpiece. When positioning of the truck 21 is necessary to prevent movement in a back-and-forth direction, the positioning device 45, 45 illustrated in FIG. 5 may be used.

While the invention has been particularly shown and described with reference to preferred embodiments thereof, it will be understood by those skilled in the art that various alterations in form and detail may be made therein without departing from the spirit and scope of the invention. For example, the workpiece fixtures may be fixed on the base plate 13, and the columns 14, 14' provided with a composite frame including three moving members adapted to be placed on a truck 21 which is also movable as illustrated.

The embodiments of the invention in which an exclusive property or privilege is claimed are defined by the following:

1. An automatic welding apparatus comprising:
   a welding torch;
   a composite frame adapted to movably mount said torch such that said torch may be located at a predetermined position within a work space;
   said composite frame adapted to move said torch in a longitudinal direction, a lateral direction, and a vertical direction as well as being rotatable around a vertical axis;
   a workpiece holder for securing a workpiece thereto such that said workpiece or portions thereof are located within the limits of said work space;
   said workpiece holder including a pair of spaced apart fixtures which are rotatable around a horizontal axis;
   means for controlling the angular position of said pair of spaced apart fixtures;
   a movable base for supporting either said frame or said workpiece holder such that said frame and said holder are movable with respect to one another along a longitudinal axis;
   said movable base including a truck provided with a reversible motor adapted to drive said truck along a pair of spaced apart, parallel tracks;
   positioning means for positioning said truck along said longitudinal axis such that all portions of said workpiece may be brought within the limits of said work space of said automatic welding apparatus;
   said positioning means capable of locating said truck at a plurality of work stations situated at predetermined points along said tracks;
   said positioning means including a plurality of locating means positioned along said longitudinal axis for selectively engaging said truck only when said truck is in the vicinity of the respective predetermined positions and moving said truck to said predetermined positions and thereafter locking said truck at said predetermined positions.

2. An automatic welding apparatus as set forth in claim 1 wherein the spaced apart distance between said two fixtures with respect with said longitudinal axis is twice as long as the maximum moving distance of said torch along said longitudinal axis.

3. An automatic welding apparatus as set forth in claim 1 wherein said said locating means comprises an air cylinder swingable in an up-and-down direction mounted on a stationary base plate, said air cylinder having a rod for pulling and locking said truck in said longitudinal direction; a latch secured to the extremity of said rod; guide means for guiding said latch obliquely in an up-and-down direction; a click member projected on each side end of said truck, said click member being engageable with said latch; and a stopper provided on said stationary base plate for abutment with said track.

4. An automatic welding apparatus as set forth in claim 1 wherein said locking arrangement comprises at least one protrusion projected on the lower surface of said truck; a pair of opening and closing arms respectively mounted on segment gears meshed with each other; rollers supported on the extremity of said arms for clamping said protrusion therebetween; and an air cylinder having a rod connected with the extension of one of said segment gears.

5. An automatic welding apparatus as set forth in any one of claim 1, 3, or 4 wherein said positioning means comprises a grooved longitudinal path provided on the lower surface of said truck, said path having two throat portions spaced from each other; and a plurality of rollers supported on a stationary-base-plate member, there being at an equal distance between said adjacent rollers so as to be fitted in said throat portions for positioning said truck in an approximately perpendicular direction to said longitudinal axis in cooperation with said locking arrangement.

* * * * *